United States Patent [19]
Ziaylek

[11] 3,971,591
[45] July 27, 1976

[54] QUIC-SEAT

[75] Inventor: John Ziaylek, Yardley, Pa.

[73] Assignee: Ziamatic Corporation, Yardley, Pa.

[22] Filed: May 1, 1975

[21] Appl. No.: 573,694

[52] U.S. Cl. .............................. 297/191; 297/217
[51] Int. Cl.² ......................................... A47C 7/62
[58] Field of Search ............ 297/191, 188, 217, 384

[56] References Cited
UNITED STATES PATENTS

| | | | |
|---|---|---|---|
| 817,816 | 4/1906 | Stevens | 297/191 |
| 1,887,323 | 11/1932 | Perron | 297/191 |
| 1,984,207 | 12/1934 | Ceslowitz | 297/191 |
| 2,633,905 | 4/1953 | Geldbaugh | 297/191 |
| 2,683,482 | 7/1954 | Puls | 297/384 |
| 3,436,119 | 4/1969 | Lehmann | 297/217 |

Primary Examiner—Ramon S. Britts
Assistant Examiner—Darrell Marquette
Attorney, Agent, or Firm—Sperry and Zoda

[57] ABSTRACT

A novel seat construction is provided for use in fire apparatus, ambulances or other emergency equipment and is formed with a seat upon which a rider may rest and with a backrest extending upward at the rear of the seat and provided with a cavity in which an oxygen tank or the like may be housed in such a manner as to afford comfort for the person resting on the seat and yet be available for instant use by the rider.

5 Claims, 3 Drawing Figures

U.S. Patent   July 27, 1976   3,971,591
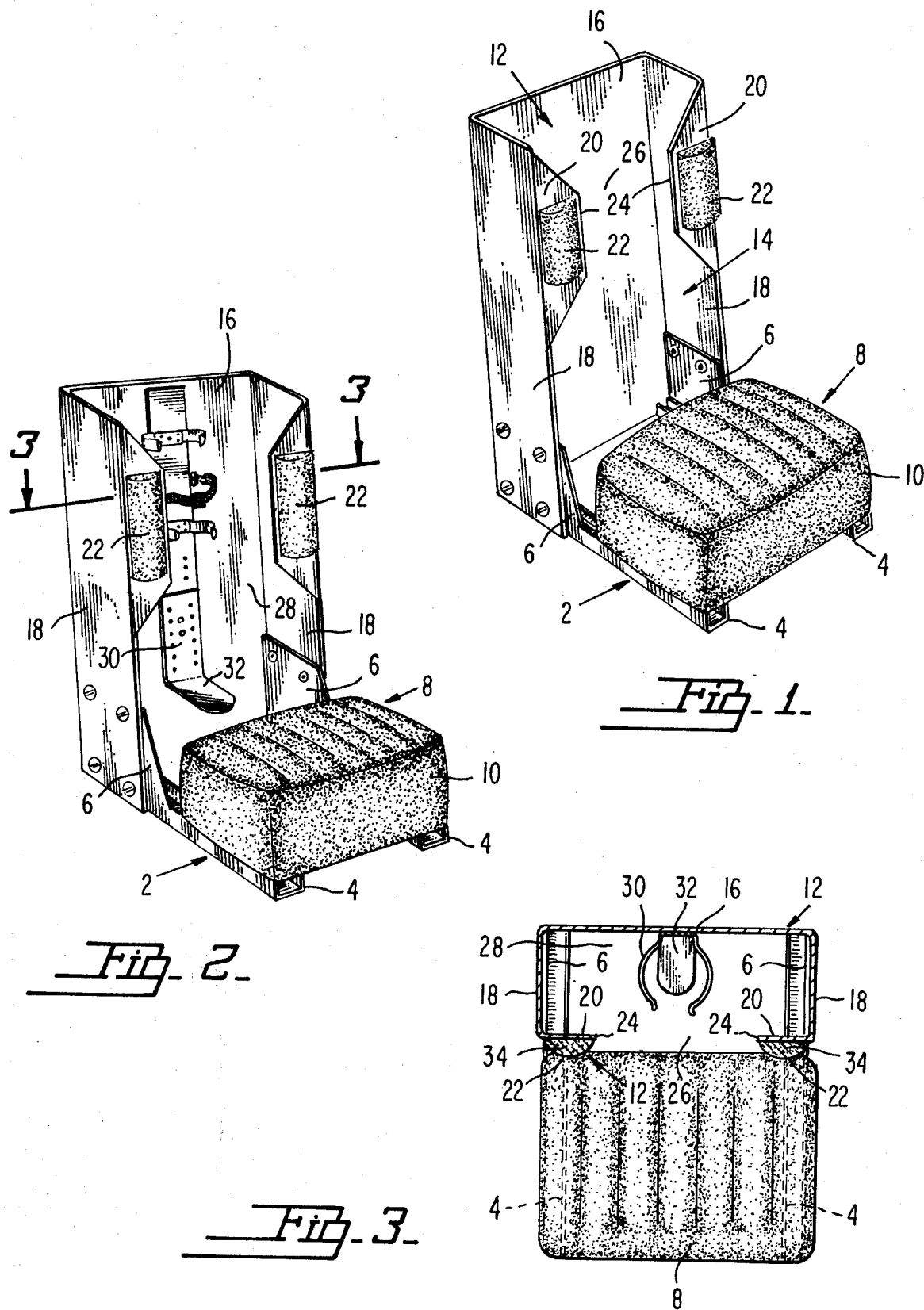

QUIC-SEAT

FIELD OF INVENTION

Firemen and other persons responding to an emergency frequently have an oxygen tank, fire extinguisher or the like secured to the users back by means of a harness or the like. In some cases the tank is applied to the wearer before he takes a seat in the vehicle and in other cases the tank is stored in the vehicle in such a way that it may be strapped in place by the user as the vehicle is traveling to the site of the emergency. In either case, it is important for the user to be firmly and comfortably seated in the vehicle as it travels to an emergency since the vehicle may swing around corners at high speed or travel over rough terrain where it is necessary to hold onto railings or other postions of the vehicle.

THE PRIOR ACT

Various types of equipment for supporting oxygen tanks or the like in position to be readily applied to a wearer have been developed heretofore as exemplified by U.S. Pat. Nos. 3,304,775, 3,490,727, 3,547,391 and 3,667,714. However, such equipment has not been designed to provide a comfortable seat and back rest for a user not equipped with an oxygen tank or to permit the user to strap the tank on his back prior to entering the vehicle. It has also been suggested that the seat of a vehicle may be provided with a back rest having a space therein for the storage of emergency equipment as exemplified by U.S. Pat. No. 2,633,905. On the other hand, such constructions are relatively complicated and are not designed to enable a person having a tank secured to his back to be seated comfortably and yet able to leave the seat without an instant delay.

THE PRESENT INVENTION

In accordance with the present invention, a seat construction is provided which includes a seat and a back rest portion having a forwardly opening cavity therein adapted for receiving or housing a tank or the like to be worn by a fireman or rescue worker but which at the same time may be used with equal comfort by persons who do not carry or use any such equipment.

These advantages are attained by providing the seat with a back rest having a cavity therein adapted to receive an oxygen tank or the like while opening forwardly to permit ready movement of the tank into and out of the cavity. At the same time, the back rest has surfaces extending laterally at opposite sides of the cavity to present an extended support for the back of a person resting on the seat. In this way, the construction serves to afford comfort and support for the users back at all times whether they have a tank strapped to their back or not.

THE DRAWING

FIG. 1 is a perspective illustrating one typical embodiment of the present invention, FIG. 2 is a perspective showing the construction of FIG. 1 with a tank supporting bracket located within the back rest portion of the seat, and FIG. 3 is a horizontal sectional view taken on the line 3—3 of FIG. 2.

In that form of the invention chosen for purposes of illustration in the drawing the seat is provided with a base structure 2 which is preferably formed of two spaced hollow sheet metal rails 4 each having an upwardly extending flange 6 adjacent the rear end thereof. The seat portion 8 of the assembly is mounted on the rails 4 and serves to hold them in fixed spaced relation. A cushion 10 of conventional construction may be embodied in the seat portion 8 in front of flanges 6.

The back rest portion 12 of the seat embodies a casing 14 of generally rectangular cross section secured at its lower end to the flanges 6 on the rails 4 of the base structure 2. The casing 14 may be formed of sheet metal and has a back wall 16 and forwardly extending side walls 18. Inwardly turned extensions 20 are provided on the side walls 18 of the casing 14 above the seat portion 8 and present forwardly facing laterally extending surfaces 22. The inner edges 24 of the surfaces 22 are spaced apart a sufficient distance to provide a forwardly facing opening 26 through which an oxygen tank of the like may be readily moved into and out of the cavity 28 within the casing 14 of the back portion of the seat.

If desired, and as shown in FIG. 2, a tank bracket 30 with a lower tank support 32 may be mounted on the back wall 16 of the casing 14 within the cavity 28 to receive and support an oxygen tank or the like. The tank and any harness or straps required for supporting it on a wearer may then be stored within the cavity 28 for ready use by any person who may occupy the seat. The user may then secure the tank in place as they travel to an emergency area. In the alternative, the tank and harness may be stored elsewhere in which case a person having a tank already strapped to his back may take his place on the seat and as he leans back against the back rest 12, the tank will move easily through the opening 26 into the cavity 28. If the bracket 30 is then present in the casing the tank will move into place on the bracket so as to relieve the wearer of its weight as he travels to the emergency location.

As shown in FIG. 3, the laterally extending surfaces 22 of the back rest portion 12 of the seat assembly are preferably provided with cushions on padding 34 and may be suitably contoured to provide comfort for anyone seated on the seat position 8, whether they are supplied with an oxygen tank or not. The seat is therefore adapted for general use while at the same time providing comfort during times of emergency.

The construction shown and described is readily adapted for installation in existing equipment and may be used in place of the usual "jump seat" employed under crowded conditions in most fire and emergency vehicles. It may, however, be installed as original equipment in a vehicle or in a firehouse or elsewhere whenever prolonged use or a continuing emergency exists.

The particular form and construction of the seat herein shown and described is preferred but it will be apparent that it is capable of various changes and modifications without departing from the invention.

I claim:

1. A seat for use in emergency vehicles comprising a lower seat portion and a back rest portion extending upwardly above said seat portion, said back rest portion having a cavity therein provided with side walls and an opening facing toward the front of the seat portion through which an oxygen tank or the like may be readily moved into and out of the cavity, said back rest portion further having spaced laterally projecting extensions mounted on said side walls and located on opposite sides of said forwardly facing opening in position to serve as forwardly facing back support surfaces for a person seated on said seat portion and having an oxygen tank or the like mounted on his back.

2. A seat as defined in claim 1 wherein there is a base structure upon which said seat portion is mounted, said back portion is in the form of a casing of generally rectangular cross section secured at its lower end to said base structure and extending upward therefrom above said seat portion, said casing defining a cavity having an opening in the front thereof through which an oxygen tank or the like can be readily inserted and removed, and said laterally projecting extensions extend inward from opposite sides of said casing toward said opening.

3. A seat as defined in claim 1 wherein said seat portion and laterally projecting extensions are provided with cushioning means.

4. A seat as defined in claim 1 wherein means are located within the cavity in said back rest portion for supporting an oxygen tank or the like therein.

5. A seat as defined in claim 2 wherein a bracket for supporting an oxygen tank or the like is mounted in said casing.

* * * * *